United States Patent
Zhang et al.

(10) Patent No.: US 8,374,266 B2
(45) Date of Patent: Feb. 12, 2013

(54) ITERATIVE CHANNEL ESTIMATION METHOD AND APPARATUS FOR ICI CANCELLATION IN MULTI-CARRIER

(75) Inventors: Xiabo Zhang, Shanghai (CN); Ni Ma, Shanghai (CN)

(73) Assignee: NXP B.V., Eindhoven (NL)

( * ) Notice: Subject to any disclaimer, the term of this patent is extended or adjusted under 35 U.S.C. 154(b) by 181 days.

(21) Appl. No.: 13/057,259

(22) PCT Filed: Aug. 4, 2008

(86) PCT No.: PCT/CN2008/001422
§ 371 (c)(1),
(2), (4) Date: Feb. 2, 2011

(87) PCT Pub. No.: WO2010/015104
PCT Pub. Date: Feb. 11, 2010

(65) Prior Publication Data
US 2012/0014465 A1    Jan. 19, 2012

(51) Int. Cl.
*H04K 1/10* (2006.01)
*H04L 27/28* (2006.01)

(52) U.S. Cl. ......................... 375/260; 375/259

(58) Field of Classification Search ............ 375/260
See application file for complete search history.

(56) References Cited

U.S. PATENT DOCUMENTS

| | | | |
|---|---|---|---|
| 5,960,032 A * | 9/1999 | Letaief et al. | 375/146 |
| 6,768,713 B1 | 7/2004 | Siala et al. | |
| 6,990,153 B1 * | 1/2006 | Farhang-Boroujeni et al. | 375/260 |
| 2007/0297522 A1 | 12/2007 | Baggen et al. | |
| 2010/0172316 A1 * | 7/2010 | Hwang et al. | 370/330 |

FOREIGN PATENT DOCUMENTS

| | | |
|---|---|---|
| CN | 101136896 A | 3/2008 |
| WO | 2006/130541 A2 | 12/2006 |
| WO | 2007/002924 A1 | 1/2007 |
| WO | 2007/112489 A1 | 10/2007 |
| WO | 2008/083303 A2 | 7/2008 |

OTHER PUBLICATIONS

Zhao, Y., et al; "Sensivity to doppler shift and carrier frequency errors in OFDM Systems—The Consequences and Solutions"; IEEE $46^{th}$ Vehicular Technology Conf., Atlanta, GA, USA; pp. 1564-1568 (Apr. 1996).

Armstrong, Jean; "Analysis of New and Existing Methods of Reducing Inter-Carrier Interference Due to Carrier Frequency Offset in OFDM"; IEEE Trans. Commun. vol. 47, No. 3; pp. 365-369 (1999).

Jeon, Won Gi; "An Equalization Technique for Orthogonal Frequency-Division Multiplexing Systems in Time Variant Multi-Path Channels"; IEEE Transactions on Communications, vol. 47, No. 1 (Jan. 1999).

(Continued)

*Primary Examiner* — Erin File

(57) ABSTRACT

A linear iterative channel estimation scheme and corresponding pilot allocation scheme are provided to perfect a channel model that cancels the Inter-Carrier Interference (ICI) for multi-carrier systems (e.g., OFDM, SC-FDMA, MC-CDMA, etc.) under high mobility conditions. Two issues of the linear iterative channel estimation scheme of the channel model, namely, overloaded pilots and increased Gauss noise are specifically addressed by exemplary embodiments. With the iterative channel estimation scheme provided by the present invention, the minimum pilot number is equal to the length of multi-path delay, and the Gauss noise is not increased.

14 Claims, 5 Drawing Sheets

OTHER PUBLICATIONS

Choi, Yang-Seok; "On Channel Estimation and Detection for Multicarrier Signals in Fast and Selective Rayleigh Fading Channels"; IEEE Transactions on Communications, vol. 49, No. 8; 13 pages (Aug. 2001).

Liu, Ke, et al; "Orthogonal Time-Frequency Signaling Over Doubly Dispersive Channgels-Draft"; 43 pages (Feb. 2003).

Tomansin, Stefano, et al; "Interative Interference Cancellation and Channel Estimation for Moble OFDM"; IEEE Transactions on Wireless Communications, vol. 4, No. 1; 8 pages (Jan. 2005).

Mostofi, Yasmin, et al; "ICI Mitigation for Mobile OFDM Receivers"; IEEE, Piscataway, NJ, US ; pp. 3351-3353 (May 2003).

Ozbek, Berna, et al; "Pilot-Symbol-Aided Iterative Channel Estimation for OFDM-Based Systems"; 5 pages; (Aug. 2005).

Chang, Kapseok; "Cancellation of ICI by Doppler Effect in OFDM Systems"; IEEE VTC (2006).

3 GPP; "TR 25.814 V1.22—Physical Layer Aspects of Evolved UTRA" Release 7; 108 pages (Mar. 2006).

Sheu, Chorng-Ren; "A Low-Complexity Concatenated ICI Cancellation Scheme for High Mobility OFDM Systems"; IEEE WCNC (2007).

Peng, Yuexing, et al; "Iterative Partial-Interference-Cancellation-based Detector for OFDM Systems Over Doubly-Selective Rayleigh Fading Channels"; 18$^{th}$ Annual IEEE Symp on Personal, Indoor and Mobile Radio Comm; 5 pages (Sep. 2007).

Li, Rui, et al "Iterative Receiver for MIMO-OFDM System With Joint ICI Canellation and Channel Estimation"; IEEE WCNC 2008; pp. 7-12; (Apr. 3, 2008).

\* cited by examiner

ITERATIVE CHANNEL ESTIMATION METHOD AND APPARATUS FOR ICI CANCELLATION IN MULTI-CARRIER

The present invention relates generally to communication systems more particularly to an iterative channel estimation apparatus and method for Inter Carrier Interference (ICI) cancellation in multi-carrier systems, and devices using the channel estimation apparatus and method.

In multi-carrier systems, a symbol duration is increased by splitting the high-rate serial data stream into many low-rate parallel streams. In orthogonal frequency division multiplexing (OFDM), for example, a stream of signals is modulated on many equally spaced parallel subcarriers. Modulation and demodulation are implemented by means of an Inverse Fast Fourier Transform (IFFT) and its inverse (FFT), respectively. The orthogonality of the signals, when transmitted over a radio channel, can only be maintained if the channel is flat and time-invariant. For time-varying channels, self-interference occurs, among others, at different subcarriers and is called Inter Carrier Interference (ICI). Some proposed solutions for ICI mitigation require a modification to the transmit format and are thus not suitable for existing standards. Others without this requirement cannot be used due to high speed of the user devices, e.g., when used in a vehicle, train or plane at their normal cruising speeds. Meanwhile, still other schemes are too complex for a typical mobile user electronic device.

As shown in FIG. 1 an OFDM system is an example of a multi-carrier system in which the frequency domain signals are transformed into a time domain by an IFFT module 101:

$$s(n) = \sqrt{\frac{1}{N}} \sum_{k=0}^{N-1} d_k e^{j2\pi nk/N} (-(N-1) \le n \le N-1) \quad \text{Equation 1}$$

The received signal y(n) can be expressed as:

$$y(n) = \sum_{l=0}^{L} h(n, l) s(n-l) + w(n) \quad \text{Equation 2}$$

Replacing s(n) with Equation 1, Equation 2 can be rewritten as:

$$y(n) = \sqrt{\frac{1}{N}} \sum_{k=0}^{N-1} d_k H_k(n) e^{j2\pi nk/N} + w(n) \quad \text{Equation 3}$$

where $H_k(n) = \sum_{l=0}^{L} h(n, l) e^{-j2\pi lk/N}$.

The $k^{th}$ sub-carrier output from the FFT module 102 can be expressed as:

$$Y_k = \sqrt{\frac{1}{N}} \sum_{k=0}^{N-1} y(n) e^{-j2\pi nk/N} = d_k H_k + \alpha_k + w_k \quad \text{Equation 4}$$

where $$H_k = \frac{1}{N} \sum_{n=0}^{N-1} H_k(n) \quad \text{Equation 5}$$

$$\alpha_k = \frac{1}{N} \sum_{m=0, m \ne k}^{N-1} d_m \sum_{n=0}^{N-1} H_m(n) \exp[j2\pi n(m-k)/N] \quad \text{Equation 6}$$

$$w_k = \sqrt{\frac{1}{N} \sum_{n=0}^{N-1} w(n) e^{-j2\pi nk/N}} \quad \text{Equation 7}$$

The $d_k H_k$ represents the expected received signal and the $\alpha_k$ represents Inter-Carrier Interference (ICI) caused by the time-varying nature of the channel. $w_k$ represents white Gaussian noise. Thus, ICI is structured according to the transmit standard.

The ICI is a significant problem for multi-carrier systems, especially in a high mobility environment. As an inherent interference within OFDM-based systems, ICI results from incomplete orthogonality of the sub-carriers, which is caused by several factors, e.g., carrier frequency offset between transmitter and receiver, Doppler Effect, etc. The mobile radio channel brings the spectrum spread to the received signals. When a pure sinusoidal tone of frequency $f_c$ is transmitted, the received signal spectrum, called as Doppler spectrum, will have components in the range $f_c - f_m$ to $f_c + f_m$, which is shown in FIG. 2.

Considering one sub-carrier on the receiving side, the data on one sub-carrier is interfered with by the data on other sub-carriers, as described by the following Equations 8 and 9

$$d_i' = c_0 d_i + \sum_{\substack{l=0-15 \\ l \ne i}} c_{l-i} d_l \quad \text{Equation 8}$$

where $d_i$ represents transmitted data, $d_i'$ represents the corresponding received data, and represents the ICI coefficient representing the ICI power level from the $l^{th}$ sub-carrier on the $i^{th}$ sub-carrier:

$$c_{l-i} = \frac{1}{N} \frac{\sin\pi(l-i+\Delta fT)}{\sin\pi\left(\frac{l-i+\Delta fT}{N}\right)} \times \exp j\pi \frac{(N-1)(l-i+\Delta fT)}{N} \quad \text{Equation 9}$$

A major reason that past proposed ICI cancellation schemes have not solved the ICI problem is the lack of a suitable channel model for addressing the ICI problem in multi-carrier wireless communication systems.

In the present invention a more accurate channel model is assumed. This is a new model in which the basic idea is modelling the frequency domain channel features (ICI included) as having two parts: a first part comprising multiple fixed matrices and a part comprising unfixed variables. The unfixed variables are estimated via the pilots. The more fixed matrices that are used, the more accurately the channel is estimated. Moreover, the unfixed variables can be estimated by a linear algorithm. This new model is described in concurrently Provisional Patent Application by the present inventors, entitled "A Novel Radio Channel Model For ICI Cancellation In Multi-Carrier Systems", the entire contents of which is herein incorporated by reference.

The Doppler spectrum spread (range from $f_c - f_m$ to $f_c + f_m$) is divided into many small segments during which the channel impulse response remains almost the same. For each segment, the channel model in Equation 9 serves as a baseline. First, channel impulse response is described for every segment by employing fixed matrices and unfixed variables to represent Equation 9. By combining all segments, the channel impulse response on the whole Doppler spectrum spread is achieved.

If the segmented Doppler spread is small enough, the corresponding channel response can be treated as an impulse function in the frequency domain, as shown in FIG. 3.

For each segment, the received signal is:

$$y(n) = \sum_{l=0}^{L} h(l)\exp(j\Delta f n)s(n-l) + w(n)$$

where L represents the maximum multipath delay, $\Delta f$ represents the unitary frequency offset for the segmentation, and h(l) represents the time domain channel parameters within one OFDM symbol. After the FFT operation at the receiver side, the received frequency domain signal is:

$$Y = \sum_{l=0}^{L} h(l)[E_l X + CE_l X] \quad \text{Equation 10}$$

where $Y = \begin{bmatrix} Y_0 \\ Y_1 \\ \vdots \\ Y_{N-1} \end{bmatrix}$ is the received signals in frequency domain, $$X = \begin{bmatrix} X_0 \\ X_1 \\ \vdots \\ X_{N-1} \end{bmatrix}$$

is the transmitted signals in the frequency domain, $$E_l = \begin{bmatrix} \exp(-j2\pi l \cdot 0/N) & 0 & \cdots & 0 \\ 0 & \exp(-j2\pi l \cdot 1/N) & \cdots & 0 \\ \vdots & \vdots & \ddots & \vdots \\ 0 & 0 & \cdots & \exp(-j2\pi l \cdot (N-1)/N) \end{bmatrix}$$

is the phase rotation matrix resulting from propagation delay and $$C = \begin{bmatrix} 0 & c_1 & c_2 & \cdots & c_{N-1} \\ c_{-1} & 0 & c_1 & \cdots & c_{N-2} \\ c_{-2} & c_{-1} & 0 & \cdots & c_{N-3} \\ \vdots & \vdots & \vdots & \ddots & \vdots \\ c_{-(N-1)} & c_{-(N-2)} & c_{-(N-3)} & \cdots & 0 \end{bmatrix}$$

is the matrix representing ICI, in which $c_s$ is described in Equation 9. As derived in Appendix A, $$c_s \approx \sum_{t=0}^{T} f_t(\Delta f) ctg^t(\pi s/N)(ctg(\pi s/N) - j) \quad \text{Equation 11}$$

where T represents the rank number used to describe the ICI. The bigger T is, the more accurate Equation 11 will be. Therefore, Equation 11 can be rewritten as:

$$Y = \sum_{l=0}^{L} \left( h_0(l) E_l X + \sum_{t=1}^{T} h_t(l) C_t E_l X \right) \quad \text{Equation 12}$$

where $h_t(l)$ represents the unfixed variables including the channel impulse response and Doppler frequency offset for corresponding segment, $$C_t = \begin{bmatrix} 0 & c_1^t & c_2^t & \cdots & c_{N-1}^t \\ c_{-1}^t & 0 & c_1^t & \cdots & c_{N-2}^t \\ c_{-2}^t & c_{-1}^t & 0 & \cdots & c_{N-3}^t \\ \vdots & \vdots & \vdots & \ddots & \vdots \\ c_{-(N-1)}^t & c_{-(N-2)}^t & c_{-(N-1)}^t & \cdots & 0 \end{bmatrix},$$

and $c_s^{\ t} = ctg^t(\pi s/N)(ctg(\pi s/N)-j)$. The matrices $C_t E_l (0 \leq t \leq T)$ of one path are the progressional spread of ICI, and t is the progressional rank. Usually the variables corresponding to lower rank matrices are larger than the variables corresponding to the higher rank matrices, i.e., $h_{t1}(l) > h_{t2}(l)(t_1 < t_2)$.

Combining all the segmentations of the Doppler spread, a practical channel model is achieved. The matrices $C_t$ and $E_l$ are fixed and only the $h_t(l)$'s are altered along with segmentations. Therefore, the format of the proposed channel model on the whole Doppler spread is the same as Equation 12, the only difference lies in $h_t(l)$.

In order to use Equation 12 to describe the channel features, a total of (L+1)(T+1) variables of ($h_t(l)$) have to be estimated. A basic linear estimation algorithm is provided as an example only of how to obtain the variables $h_t(l)$. This linear estimation algorithm can be used to estimate the variables if one OFDM symbol includes (L+1)(T+1) pilots signals (or more). An example of a basic linear estimation scheme is described below.

Let the transmitted data be zero value to construct:

$$X = [P_0\ 0 \ldots 0 P_1\ 0 \ldots 0 \ldots P_{(L+1)(T+1)-1}]^T,$$

where $P_s$ represents a pilot signal and $[\ldots]^T$ is the transposition operator. Correspondingly, the received Pilot signals in the frequency domain are:

$$Y = [y_0\ 0 \ldots 0\ y_1\ 0 \ldots 0 \ldots y_{(L+1)(T+1)-1}]^T$$

Substituting X and Y into Equation 12 results in (L+1)(T+1) equations. Then, the variables are derived by solving these linear equations, which means low processing delay and achievable performance, especially under high SNR condition.

The above channel model has two issues:

- pilots are overloaded, that is, at least (L+1)(T+1) pilots are necessary in one OFDM symbol, which reduces the transmission efficiency, especially when the number of sub-carriers allocated to one user is small; and
- the linear channel estimation operation increases the Gauss noise power level and makes the estimation difficult, especially under a low SNR condition, even using an MMSE algorithm.

The present invention assumes the above new channel model comprising multiple fixed matrices and unfixed variables, as shown in Equation 12 which describes the channel response, where a total of (L+1)(T+1) variables ($h_t(l)$) are estimated.

Given this channel model and further assuming one OFDM symbol includes (L+1)(T+1) pilot signals (or more), the present invention provides an iterative channel estimation scheme and a corresponding pilot allocation scheme which makes it possible to accurately estimate the channel response while not significantly increasing the Gauss noise power level. A system and devices employing these schemes are also provided.

For the assumed channel model, an exemplary embodiment of the present invention performs the above channel estimation iteratively as follows. Considering that the matrices of one path are the progressional spread of the ICI, the unfixed variables corresponding to lower rank matrices are usually larger than those corresponding to higher rank matrices. Therefore, the variables corresponding to the lowest rank matrix for every path are first estimated, and then the contribution of the lowest rank matrix to the received signals is removed. By considering this iterative operation as a 'round' and repeating this operation as a series of 'round's, all variables can be estimated to finally obtain the channel estimation.

Further, in order to decrease correlation between different paths, an associated pilot allocation method is provided by the present invention.

Other features and advantages of the present invention will become apparent from the following detailed description, taken in conjunction with the accompanying drawings, illustrating by way of example the principles of the present invention.

Figure 1:
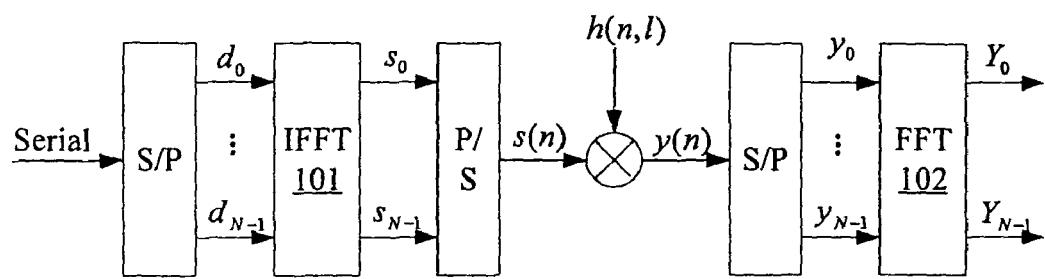
FIG. 1 illustrates a conventional OFDM system model.
Figure 2:
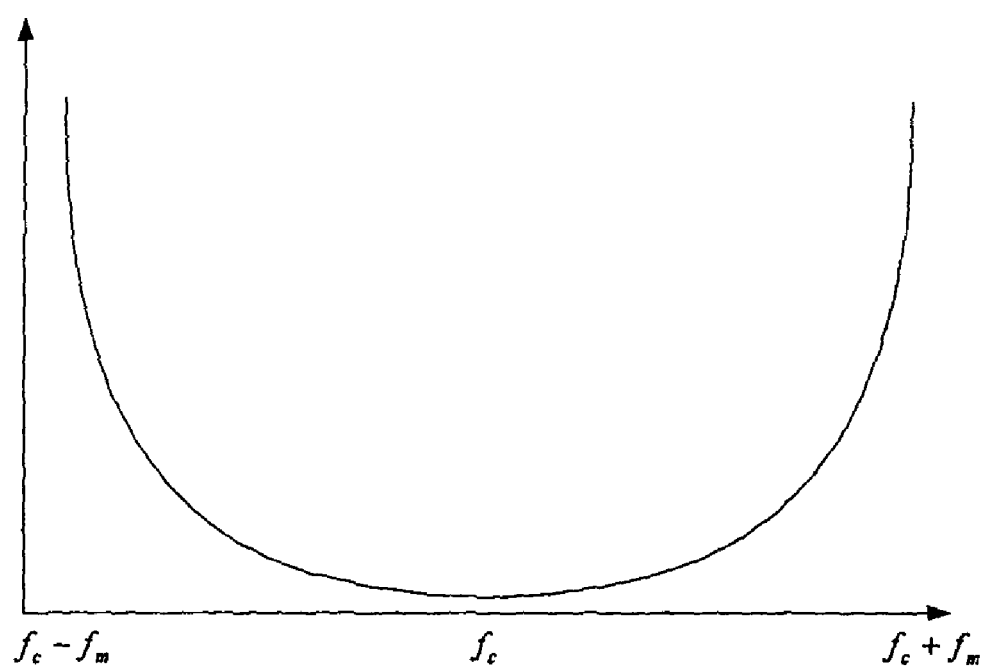
FIG. 2 illustrates the spectrum shape of a Doppler spread.
Figure 3:
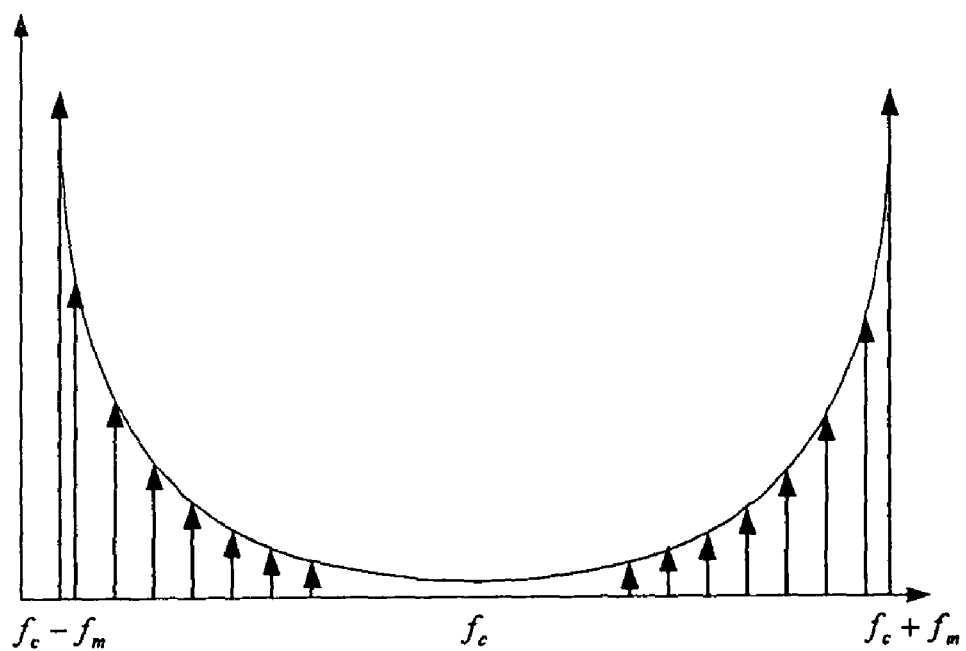
FIG. 3 illustrates segmentation of the Doppler spectrum spread.

A detailed description of the iterative channel estimation method and system to which this method is applied, are now provided.

In a first round, $\hat{h}_0(l)(0 \leq l \leq L)$ is estimated according to:

$$Y_p \approx \sum_{l=0}^{L} (h_0(l) E_l X_p) + W_p \qquad \text{Equation 13}$$

where $X_P$ is the transmitted pilot signals in the frequency domain (the signals of the data part are set as zero), $Y_P$ is the received pilot signals in the frequency domain (the signals of data part are set as zero). Only if the number of pilots exceeds L can an estimate $\hat{h}_0(l)(0 \leq l \leq L)$ of $h_0(l)$ be determined by solving Equation 13 (e.g., via ZF, MMSE, etc).

In the second round, the estimated contribution for the first rank is removed and Equation 13 is rewritten as:

$$Y_p - \hat{h}_0(l) E_l X_p \approx \sum_{l=0}^{L} (h_1(l) E_l C_1 X_p) + w_p \qquad \text{Equation 14}$$

Then $\hat{h}_t(l)(0 \leq l \leq L)$ can be determined by solving Equation 14.

The second round operation is repeatedly solved (iterated) until the variables with higher rank are obtained.

Two further considerations regarding the iterative channel estimation method are the maximum rank number and the coefficient of adjustment, which are determined in exemplary embodiments as described in the following.

Equation 14 shows that $\hat{h}_t(l)(0 \leq l \leq L)$ is accurately estimated when the remaining ICI power is higher than the Gauss noise power by a predetermined tolerance. Otherwise, the remaining ICI isn't the main interference and should be cancelled. In addition, an inaccurately estimated $\hat{h}_t(l)(0 \leq l \leq L)$ will sometimes introduce unacceptable error when performing channel equalization. Therefore, the receiver should decide the maximum rank T that is to be estimated. One of two alternatives is employed in exemplary embodiments of the present invention:

(1) Predefine T according to the terminal's mobility—At the given carrier frequency, the ICI power is mainly influenced by the terminal's mobility. Therefore, the receiver predefines T, assuming the terminal's speed is known. First, the ICI power for rank t is estimated by the elements of $C_t$:

$$c_s = f_t(DfT, N) ctg^t(sp/N)(ctg(sp/N) - j),$$

where $$f_t(\Delta fT, N) = \frac{1}{N}\left(1 - jtg\frac{\Delta fT\pi}{N}\right) \sin\pi\Delta fT \exp(j\pi\Delta fT)(-1)^t tg^t \frac{\Delta fT\pi}{N}$$

then the receiver compares $c_s$ with the SNR and selects a suitable T.

(2) Determine T in real-time according to the remaining ICI power—The maximum rank T can also be decided in real-time while performing iterative channel estimation. The receiver compares the remaining ICI power with the SNR power, and terminates at the next round operation if the remaining ICI is below the SNR by a predetermined threshold value.

The second consideration is the determination of the coefficient of adjustment of $C_t$. From Equation 14, it follows that the diagonal element of $C_t$ increases greatly with the rank t. Therefore, a matrix $C_t$ with higher rank can be multiplied by a small coefficient so that the $\hat{h}_t(l)(0 \leq l \leq L)$ is too small for calculation precision. The value of the coefficient is itself adjusted according to t, FFT size N, and a practical precision requirement. A suggested way to define the coefficients is: $(p/N)^t$. That is, for practical implementation $C_t$ can be unified as: $(p/N)^t C_t$ Distributed pilot allocation is accomplished as follows, in an exemplary embodiment of the present invention. According to Equation 15 and Equation 16, in the $i^{th}$ iteration of the first round ($C_0 = E_0$), $h_t(l)(0 \leq l \leq L)$ will be estimated according to:

$$Y_p \approx [E_0 C_i X_p \quad E_1 C_i X_p \quad \ldots \quad E_L C_i X_p] \begin{bmatrix} h_i(0) \\ h_i(1) \\ \vdots \\ h_i(L) \end{bmatrix} + w_p \qquad \text{Equation 15}$$

$$= Q_i \begin{bmatrix} h_i(0) \\ h_i(1) \\ \vdots \\ h_i(L) \end{bmatrix} + w_p$$

The relativity of $Q_i$'s column vectors are decided by $E_l(0 \leq l \leq L)$, so $E_l(0 \leq l \leq L)$ should be as un-relative as possible. The diagonal elements in the pilots' part of $E_l(0 \leq l \leq L)$ are $\exp(-j2\pi ls \cdot 0/N)$ (s is the sub-carrier index of the pilots). On the one hand, the pilots shouldn't be allocated too closely otherwise the adjacent column vectors of $Q_i$ will be quite relative (the relativity means the relativity between $Q_i$'s column vectors, i.e., $(Q_i^s)^H Q_i^t$ (s t), where and $Q_i^s$ and $Q_i^t$ are two column vectors of $Q_i$, and $(.)^H$ means the conjugate-transpose). On the other hand, to avoid the ICI on the pilots from the data, the pilots sub-carriers should be allocated as continuously as possible (this means all pilots should be as close as possible, i.e., all the pilots are continuously divided into only one group). Therefore, a good trade-off scheme is provided by the present invention for pilot allocation. That is, all the pilots allocated to one user equipment UE are divided into L groups (L is the maximum multi-path delay). Every group of the pilots is then continuously allocated in the frequency domain sub-carriers, but different groups are distributed across all the available bandwidth with similar sub-carrier gaps.

Figure 4:
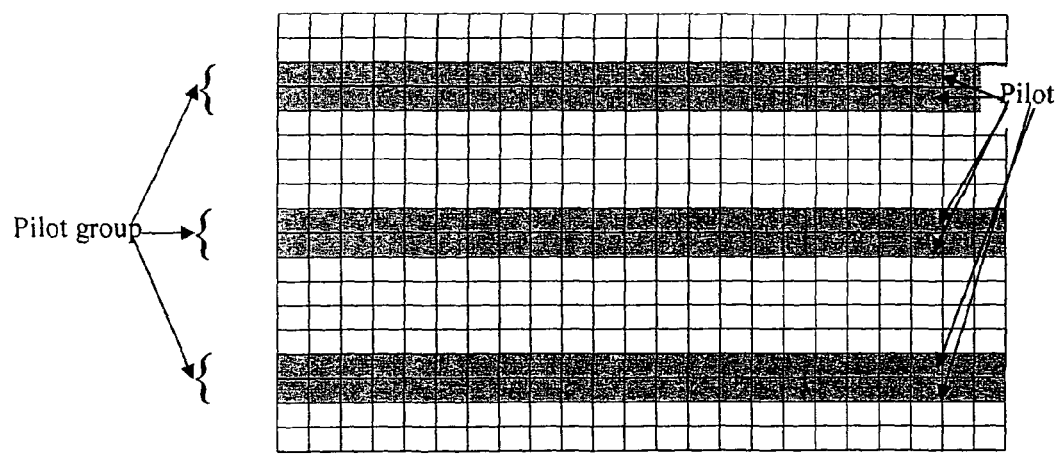
FIG. 4 illustrates an example of a pilot allocation scheme, according to the present invention.

Assuming there are 18 sub-carriers, maximum 3 path delay, 6 pilots for each OFDM symbol, FIG. 4 shows such a pilot allocation scheme having 3 groups of 2 pilots each.

Figure 5:
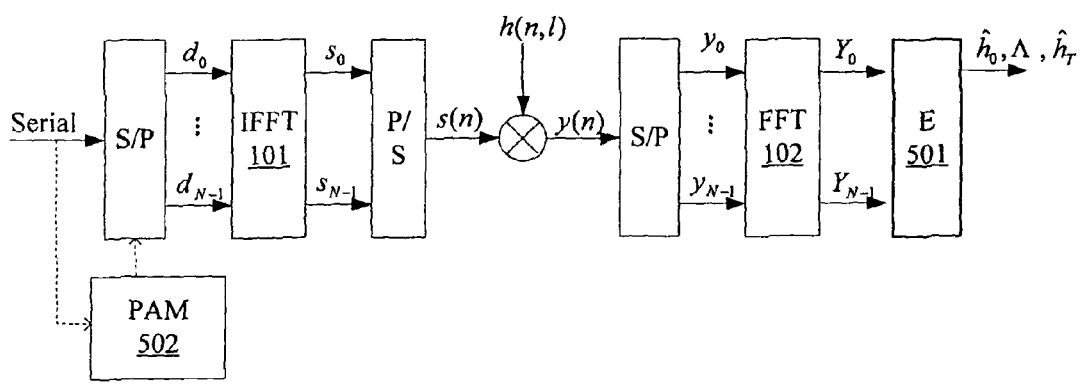
FIG. 5 illustrates and OFDM system modified according to the present invention to include an estimation module that iteratively estimates the channel features and performs ICI cancellation.

Referring now to FIG. 5, an exemplary embodiment of an OFDM system according to the present invention is illustrated in which a transmitter side comprises means to implement a pilot assignment module for distributed pilot allocation that is diagrammatically shown by the block PAM 502 and a receiver side comprises means to implement an iterative channel estimation scheme that is diagrammatically shown by the block E 501. In the present invention an OFDM system transmit blocks of N symbols where the shape and size of the block processed on reception is free, in order to best match block size to the system architecture. Further, the OFDM system assigns L groups of pilots for each UE where L is the maximum multi-path delay, according to the distributed pilot allocation scheme of the present invention. Maximum rank number T is established using one of two approaches provided by the current invention. In one instance the maximum rank and distributed allocation is pre-defined by the OFDM system when the UE first associates with the OFDM system and is part of the assumed channel model of the present invention. In the case of real-time definition of T, T is determined by the receiver during iterative channel estimation.

The purpose of the invention is to estimate the channel by estimating and cancelling ICI through an iterative process disclosed above and accomplished by module E 501. This is accomplished by transmitting pilot signals (composed of L groups of pilots that are assigned by a pilot assignment module PAM 502 of high layers) and the OFDM receiver of FIG. 5 demodulating a received signal using the Fast Fourier transform 102. Then, using the corresponding received pilot signals, E 501 iteratively calculating and removing ICI by computing Equation 10 for the first round of an iteration and Equation 11 for the remaining rounds of the iteration, up to an including rank T, wherein the rank may be determined in real-time as disclosed above. Further, it may be necessary for E 501 to apply a coefficient of adjustment to higher rank matrices, as described above, during the iterative channel estimation. Once the channel estimation is completed the results are used by the receiver to determine the data part of received signals.

While exemplary embodiments of the present invention have been provided, one skilled in the art will realize that the invention is not limited to the specific details and exemplary embodiments shown and described herein. Accordingly, various modifications may be made thereto without departing from the spirit or scope of the general inventive concept as defined by the appended claims and their equivalents.

APPENDIX A

The ICI power calculation is estimated according to the following:

$$c_s = \frac{1}{N}\left(1 - jtg\frac{\Delta fT\pi}{N}\right)\frac{\sin\pi\Delta fT\exp(-j\pi s/N)\exp(j\pi\Delta fT)}{\sin(s\pi/N) + \cos(s\pi/N)tg\frac{\Delta fT\pi}{N}}$$

$$= F(\Delta fT, N)\frac{1 - jtg(s\pi/N)}{tg(s\pi/N) + tg\frac{\Delta fT\pi}{N}}$$

$$= F(\Delta fT, N)\frac{ctg(s\pi/N) - j}{1 + tg\frac{\Delta fT\pi}{N}ctg(s\pi/N)}$$

where $$tg\frac{\Delta fT\pi}{N}ctg(s\pi/N) << 1 = F(\Delta fT, N)\left(\sum_{t=0}^{\infty}(-1)^t tg^t\frac{\Delta fT\pi}{N}ctg^t(s\pi/N)\right)(ctg(s\pi/N) - j)$$

$$= \sum_{t=0}^{\infty} f_t(\Delta fT, N)ctg^t(s\pi/N)(ctg(s\pi/N) - j)$$

where $F(\Delta fT,N)$ is a function of $\Delta fT$ and N:

$$f_t(\Delta fT, N) = \frac{1}{N}\left(1 - jtg\frac{\Delta fT\pi}{N}\right)\sin\pi\Delta fT\exp(j\pi\Delta fT)(-1)^t tg^t\frac{\Delta fT\pi}{N}$$

What is claimed is:

1. An iterative channel estimation method for Inter-Carrier Interference (ICI) cancellation in multi-carrier systems, comprising:
   providing a pilot-based channel model for frequency domain features having two parts: a first part comprising a summation of T fixed matrices each paired one-to-one with a different second part comprising T unfixed variables, wherein pilots are allocated to a user equipment (UE) to decrease correlation between different paths and one symbol includes at least $(L+1)(T+1)$ pilot symbols such that L is a maximum multipath delay and T is a rank number of the number of pairings required to describe the ICI; and
   a receiver partially estimating the ICI with a predetermined linear estimation algorithm comprising a first round of estimating the contribution to the ICI of the lowest rank matrix for all paths and then removing the estimated ICI contribution of all paths of the lowest rank from the received signals and an iteratively performed second round estimating and removing the estimated ICI contribution of a next highest rank until a pre-determined stopping condition is achieved.

2. The method of claim 1, wherein the stopping condition is a maximum number of rounds T predefined according to the mobility of the UE.

3. The method of claim 1, wherein the stopping condition is a maximum number of rounds determined in real-time according to a remaining ICI power at the end of each round.

4. The method of claim 2, wherein the stopping condition is a maximum number of rounds determined in real-time by the receiver first determining an estimated ICI power for a rank, and then in accordance with a pre-determined condition the receiver comparing the estimated ICI power for the rank with a signal to noise ratio SNR and selecting a suitable maximum rank number T as the maximum rank in accordance with a second pre-determined condition.

5. The method of claim 4 wherein the estimated ICI power calculation is calculated according to the following $$c_s = \frac{1}{N}\left(1 - jtg\frac{\Delta fT\pi}{N}\right)\frac{\sin\pi\Delta fT\exp(-j\pi s/N)\exp(j\pi\Delta fT)}{\sin(s\pi/N) + \cos(s\pi/N)tg\frac{\Delta fT\pi}{N}}$$

$$= F(\Delta fT, N)\frac{1 - jtg(s\pi/N)}{tg(s\pi/N) + tg\frac{\Delta fT\pi}{N}}$$

$$= F(\Delta fT, N)\frac{ctg(s\pi/N) - j}{1 + tg\frac{\Delta fT\pi}{N}ctg(s\pi/N)}$$

where $$tg\frac{\Delta fT\pi}{N}ctg(s\pi/N) << 1 = F(\Delta fT, N)\left(\sum_{t=0}^{\infty}(-1)^t tg^t \frac{\Delta fT\pi}{N}ctg^t(s\pi/N)\right)$$

$$(ctg(s\pi/N) - j)$$

$$= \sum_{t=0}^{\infty} f_t(\Delta fT, N)ctg^t(s\pi/N)(ctg(s\pi/N) - j)$$

where $F(\Delta fT, N)$ is a function of $\Delta fT$ and $N$:

$$f_t(\Delta fT, N) = \frac{1}{N}\left(1 - jtg\frac{\Delta fT\pi}{N}\right)\sin\pi\Delta fT\exp(j\pi\Delta fT)(-1)^t tg^t \frac{\Delta fT\pi}{N}.$$

6. The method of claim 5, wherein the second pre-determined condition is the remaining ICI is less than the SNR power by a predetermined threshold.

7. The method of claim 4, wherein the second pre-determined condition is the remaining ICI is less than the SNR power by a predetermined threshold.

8. The method of claim 7, further comprising dividing all the pilots allocated to one user equipment (UE) into L groups where L is the maximum multi-path delay; and continuously allocating pilots within each group to frequency domain sub-carriers such that different groups are distributed on all available bandwidth while at the same time having similar sub-carrier gaps.

9. The method of claim 6, further comprising dividing all the pilots allocated to one user equipment (UE) into L groups where L is the maximum multi-path delay; and continuously allocating pilots within each group to frequency domain sub-carriers such that different groups are distributed on all available bandwidth while at the same time having similar sub-carrier gaps.

10. The method of claim 1, further comprising dividing all the pilots allocated to one user equipment (UE) into L groups where L is the maximum multi-path delay; and continuously allocating pilots within each group to frequency domain sub-carriers such that different groups are distributed on all available bandwidth while at the same time having similar sub-carrier gaps.

11. The method of claim 10, wherein the multi-carrier system is selected from the group consisting of OFDM, SC-FDMA, MC-CDMA.

12. The method of claim 9, wherein the multi-carrier system is selected from the group consisting of OFDM, SC-FDMA, MC-CDMA.

13. The method of claim 8, wherein the multi-carrier system is selected from the group consisting of OFDM, SC-FDMA, MC-CDMA.

14. The method of claim 1, wherein the multi-carrier system is selected from the group consisting of OFDM, SC-FDMA, MC-CDMA.

* * * * *